United States Patent [19]

Thomas et al.

[11] Patent Number: 4,905,598

[45] Date of Patent: Mar. 6, 1990

[54] MACHINE FOR PROCESSING A CONTINUOUS WEB OF SHEETS

[75] Inventors: Hermann Thomas, Darmstadt; Josef Herd, Munster, both of Fed. Rep. of Germany

[73] Assignee: Maschinenfabrik Goebel GmbH, Darmstadt, Fed. Rep. of Germany

[21] Appl. No.: 311,347

[22] Filed: Feb. 15, 1989

[30] Foreign Application Priority Data

Mar. 11, 1988 [DE] Fed. Rep. of Germany ....... 3808143

[51] Int. Cl.$^4$ ................................................ B41F 5/04
[52] U.S. Cl. ..................................... 101/219; 384/256
[58] Field of Search ............... 101/212, 216, 219, 220, 101/214, 215, 136, 141, 174, 178, 6, 23, 36–37, 49, 52, 74, 75, 77, 91, 92; 207/4, 18, 20.1; 384/247, 248, 252, 253, 256

[56] References Cited

U.S. PATENT DOCUMENTS

| | | |
|---|---|---|
| 3,256,812 | 8/1963 | Karrenbauer . |
| 3,326,439 | 6/1967 | Sarka ..................................... 101/216 |
| 3,500,744 | 3/1970 | Lewis ..................................... 101/23 |
| 3,512,477 | 5/1970 | Nelson ................................... 101/23 |
| 3,730,080 | 5/1973 | Deligt .................................... 101/216 |
| 3,731,620 | 5/1973 | Klemmer ............................... 101/23 |
| 3,841,722 | 10/1974 | Lehtonen ............................. 384/256 |
| 4,362,098 | 12/1982 | Stellings, Jr. et al. ............... 101/219 |
| 4,391,191 | 7/1983 | Bolza-Schunemann ............ 101/216 |
| 4,514,161 | 4/1985 | Winter .................................. 384/256 |
| 4,690,052 | 9/1987 | Paulsen ................................ 101/216 |

FOREIGN PATENT DOCUMENTS 2033515 7/1970 Fed. Rep. of Germany .
1158757 3/1967 United Kingdom .

*Primary Examiner*—Eugene H. Eickholt
*Attorney, Agent, or Firm*—Watson, Cole, Grindle & Watson

[57] ABSTRACT

A pair of engaged cylinders of a machine for processing a continuous web or sheets passing between the cylinder nip has shafts journalled at opposite ends in a machine frame with first bearings mounted in the machine on the shafts, and auxiliary casings supporting second bearings on the shafts and located inboard of the first bearings. Pairs of the casings having a gap therebetween are mounted on the frame for adjustment relative to the frame and to one another in a direction perpendicular to the shafts, and at least one pressure medium cylinder acts between the frame and at least one of the casings in such direction for adjusting the size of the gap between the casings and for thus adjusting the size of the nip between the cylinders.

11 Claims, 2 Drawing Sheets

U.S. Patent  Mar. 6, 1990  Sheet 1 of 2  4,905,598
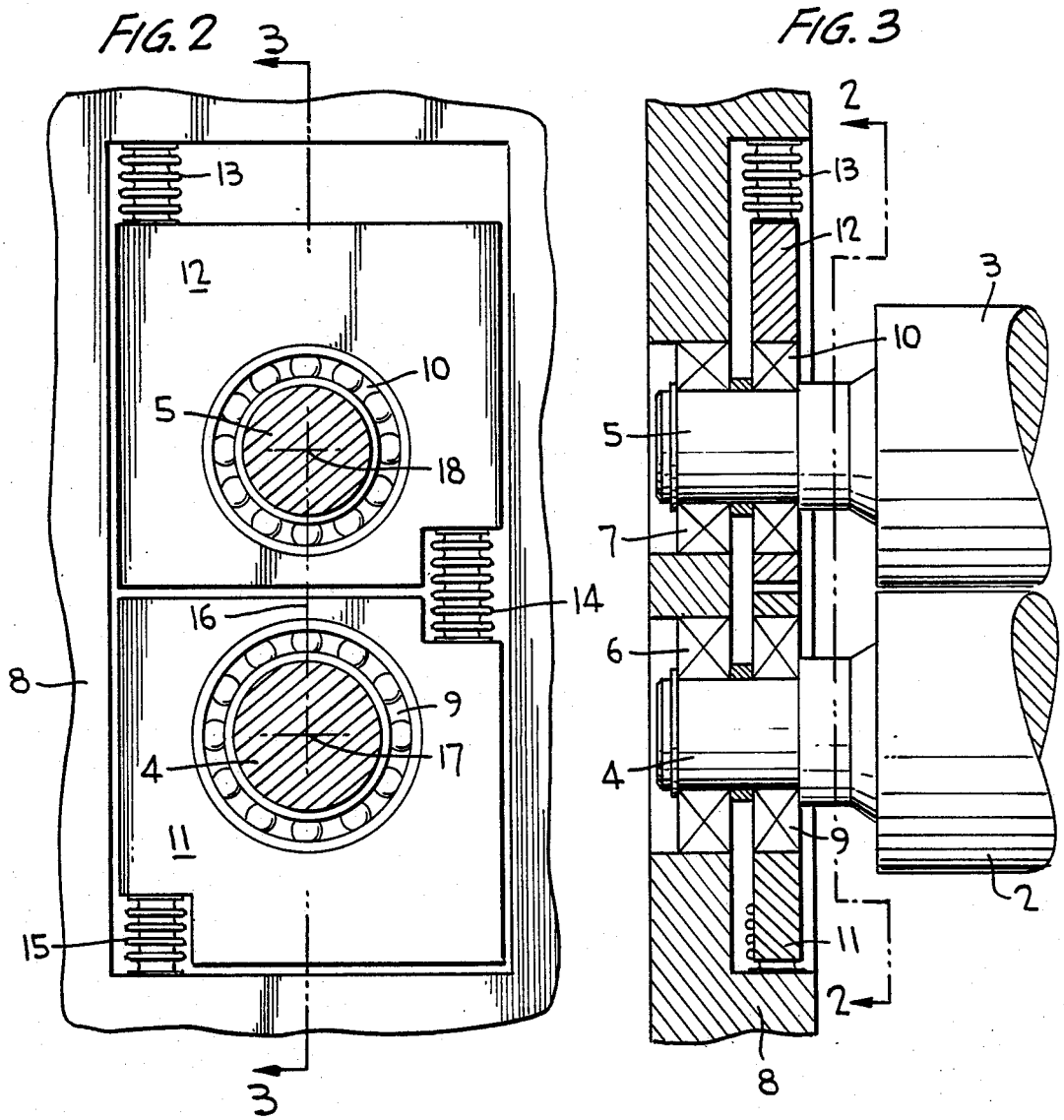

MACHINE FOR PROCESSING A CONTINUOUS WEB OF SHEETS

BACKGROUND OF THE INVENTION

This invention relates to a machine having a pair of cylinders for processing a continuous web or sheets, such as paper, fabric, foil, plastic material, metallic material, or the like, passing between the nip of the cylinders. The shafts of the cylinders are journalled at opposite ends in a frame of the machine, and two sets of bearings are provided for each of the journalled shafts, one of such bearings being supported in an auxiliary casing which is subjected to a tension producing device such as a pressure medium cylinder for adjusting the gap between the machine cylinders.

U.S. Pat. No. 3,256,812 discloses a printing machine in which the spacing of the impression and printing cylinders are capable of being regulated during machine operation by the provision of tapered members mounted between bearing housings of the cylinders.

DE-AS No. 20 33 515 discloses a single cylinder in which the journal shafts, and consequently the cylinder itself, is intended to be bent by means of pressure-generating cylinders. The engaged pressure-generating cylinders act at the axial outer ends of the journals, and a fixed bearing is located at the axial inner end of each journal. Consequently, because of the flexing forces acting thereon, such cylinder can adjust to the flexure of another cylinder of the machine. Thus, only one cylinder is flexed while such other cylinder remains unaffected.

British Patent 1,158,757 discloses a bearing arrangement for a pair of shafts carrying cooperating rolls wherein two bearings are provided for each journal of an engaged cylinder. The roller distance is said to be precisely adjusted such that each of the bearings is located in a auxillary casing and all bearings of each cylinder journal can be pressed against one another by a pressure-generating device in such a manner that any play between the bearings is eliminated. However, none of he bearings is directly located in a corresponding frame which supports the cylinder pair. Moreover, the adjustment of the distance between the axis of the two cylinders is rather cumbersome, since this would require the delicate adjustment of a wedge against the friction forces acting thereon, without reliance on any type of control mechanism. A time consuming effort is therefore required to precisely position the wedge.

SUMMARY OF THE INVENTION

It is therefore an object of the present invention to solve the problems encountered with prior machines of the aforementioned type by the provision of a bearing arrangement which can be easily serviced and extensively adjusted, even during machine operation, to variable or varying modes of operation of the engaged machine cylinders. The arrangement according to the invention controls the forces which occur during the operation of the engaged machine cylinders in such a manner that flexure of all the involved machine elements is minimal and controllable.

According to the invention each of the bearings for one cylinder journal is supported by the machine frame, and for each cylinder journal one bearing is located directly within the frame and the other bearing is located in an auxillary casing supported in the frame. Thus, the distance between adjacent auxiliary casings is adjustable by the provision of at least one pressure-generating cylinder for the adjustment of the bearings of the cylinder ends.

With such an arrangement, the flow of forces involved in the flexure of the machine cylinders passes directly along the machine frame so that within practical limits there is no, or only minimal, flexing of the frame. Moreover, it is possible to set or readjust the flexure of the cylinders or other parts of the machine so that it becomes possible to select and control flexure of the cylinders within broad limits. This includes the capability to adjust or readjust automatically or manually, the flexure of the cylinders or a flexure which, during machine operation, runs counter to the forces acting on the cylinders even during machine operation. It is possible during machine operation to set the flexure, or a counterflexure which cancels out the flexure, so as to be variable by the provision of a program that can be regulated and which can operate automatically, whereby the pressure within the pressure-generating cylinders need not drop temporarily to zero.

The auxiliary casing, located axially to the corresponding machine cylinder, is subjected to the pressure-generating device. And, the main bearings, mounted in the machine frame, and which may carry greater loads, are positioned outward of the auxiliary casings which support other bearings. Pressure-generating cylinders or adjustable tension jacks act between adjacent auxiliary casings for adjusting the gap therebetween and for correspondingly adjusting the size of the nip between machine cylinders. And, an adjustable stop or an additional pressure-generating cylinder may be located between an auxiliary casing and the machine frame. The pressure-generating cylinders may be of the type comprising a metallic bellows cylinder capable of expansion and contraction in a direction perpendicular to the cylinder shafts. Pairs of the auxiliary casings supported in the frame may be provided at one or both ends of the machine cylinder pair. And, the pressure-generating cylinders provided can be set, selectively controlled or regulated, automatically or manually.

BRIEF DESCRIPTION OF THE DRAWINGS

The invention is described in more detail when taken in conjunction with the accompanying drawings which, for the sake of clarity, exclude non-essential machine elements otherwise known to one having skill in this art.

FIG. 1 is a schematic side-elevational view of a pair cylinder rolls of the machine showing a continuous web or sheet passing through the roll nip;

FIG. 2 is a vertical elevational view, partly in section, taken substantially along the line 2—2 of FIG. 3;

FIG. 3 is a view taken substantially along the line 3—3 of FIG. 2;

DETAILED DESCRIPTION OF THE INVENTION

Figure 4:
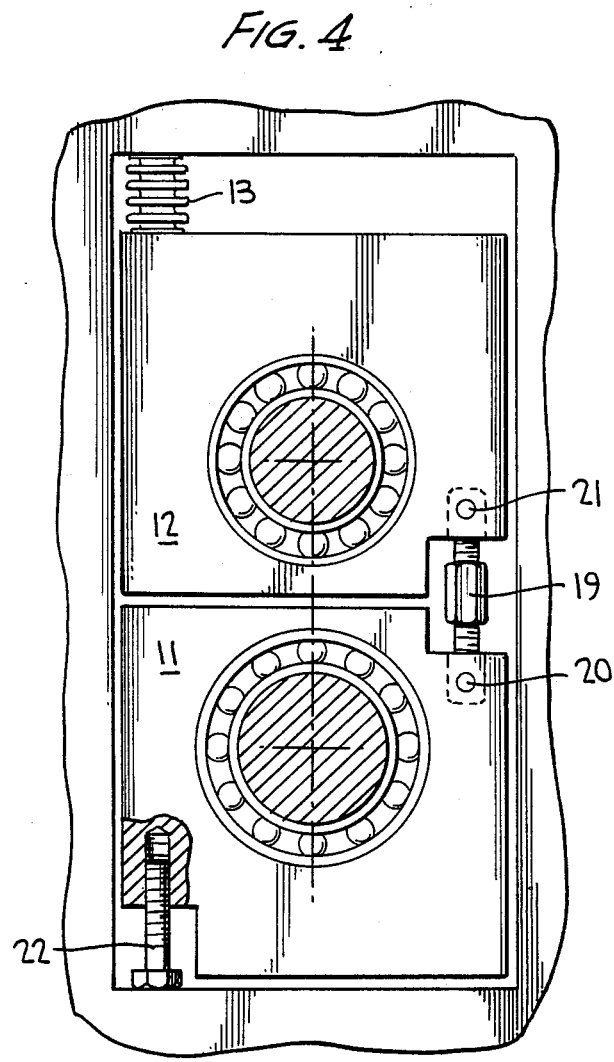
FIG. 4 is a view similar to FIG. 2 of another embodiment of the invention.

A continuous web or sheet 1 of paper, foil, fabric, plastic, metal or the like, moves between the nip of a pair of machine cylinders 2 and 3 to be processed. The process may consist of a printing operation in which case one of the cylinders comprises an impression cylinder and the other a pressure cylinder. Otherwise, the cylinders can be adapted for effecting transverse and/or longitudinal cuts, perforations or foldlines with the use of suitable elements (not shown) on one or both cylinders. And, other web or sheet processing can be carried out by the cylinder pair without departing from the invention.

To absorb the forces acting on the engaged cylinders during processing, each cylinder is provided with a cylinder journal. These journals or cylinder shafts extend outwardly of opposite ends of their respective cylinders. The bearing application of the cylinder journals is basically the same for each journal. The journals of the two engaged cylinders 2 and 3, however, act jointly with one another in a manner similar to that of the engaged cylinders themselves. Since the bearing application of the journals is basically the same for both ends of the cylinders, one or both end journals can be extended for supporting a gear wheel or the like for driving the cylinders. Only the bearing application at one end of the engaged cylinders will be described hereinafter since the bearing application at the other end is basically the same.

Cylinder 2 has a journal or shaft 4 and cylinder 3 has a journal or shaft 5. Bearings 6 and 7, which may be considered main bearings, are mounted in machine frame 8 on cylinder shafts 4 and 5 principally to absorb forces. Inwardly of and adjacent to bearings 6 and 7 are bearings 9 and 10 respectively for journals 4 and 5. These inner bearings 9 and 10 are capable of absorbing stronger forces than outer bearings 6 and 7, or both sets of bearings 6, 7 and 9, 10 are capable of absorbing forces equally.

Bearing 9 is supported by an auxiliary casing 11, and bearing 10 is supported by an auxiliary casing 12, shown in FIGS. 2 and 3. The casings are appropriately mounted on corresponding vertical, and vertically adjustable, guides (not shown) located on the frame. A pressure-generating cylinder 13, i.e., a pressure-producing device, is mounted between frame 8 and casing 12, another pressure-generating cylinder 14 extends between casings 11 and 12, and a third pressure-generating cylinder 15 is mounted between frame 8 and casing 11. These cylinders 13, 14 and 15 may each be of known construction such as a metallic bellows cylinder capable of expansion and contraction in a direction perpendicular to the rotational axes of the machine cylinders. And, the bellows cylinders are suitably mounted in place in the usual manner.

As shown in FIG. 2, pressure-generating cylinders 13 and 15 are located on one side of a plane 16 intersecting central axes 17 and 18 of the machine cylinders, and pressure-generating cylinder 14 is located on the opposite side of plane 16. Thus, for example, forces exerted by one of the pressure-generating cylinders can be channeled through bearings 9 and 10 in such a manner that any play, which exists between the cylinder journals and the corresponding bearings, can be rendered ineffective.

The pressure-generating cylinders may be hydraulically pressurized by a pressure generator equipped with a control, adjustment or regulating unit for automatic or manual control. The hydraulic fluid can be either channeled separately to each pressure-generating cylinder or jointly to all such cylinders and can optionally be adjusted, controlled or regulated individually or combined in groups, automatically or manually. Thus, it is possible to either channel the pressure agent to each cylinder separately or jointly to several cylinders or to all cylinders arranged parallel to each other.

The pressure agent can also be supplied by a controlled or stored program such that its quantity and pressure may be controlled or regulated. Such controls can be a function of various operational conditions of the machine such as, for example, different running speeds. It is also possible to modulate the pressure during machine operation to correspond to the running speed. The pressure-generating cylinders, which may comprise metallic bellows cylinders, are capable of tolerating the application of relatively strong pressures. Since the pressure-generating cylinders can be optionally supplied with different pressures and because each of such cylinders shown in the drawings can be replaced by several of such pressure-generating cylinders, the pressures exerted on auxiliary casings 11 and 12, or the forces acting on such casing or casings and their pressure centers, can be changed within wide limits. It is possible, for example, to supply the first pressure-generating cylinder with relatively high pressure, so that it will generate relatively strong forces, and the second cylinder 14 and/or the third cylinder 15 can be supplied with relatively low pressures for generating only relatively weak forces. It is also possible to allow each pressure-generating cylinder to operate with a different pressure, so that each such cylinder is capable of generating a different force or forces. In such manner the gap between cylinders 2 and 3 can be delicately adjusted as required within wide limits. And, the forces acting on auxiliary bearings 9 and 10 can also be adjusted or preset, or changed within wide limits as required throughout the operation of the machine. During such time the so-called main bearings 6 and 7 remain positioned within frame 8 without any direct changes in their bearing application. The reaction forces generated by the pressure-generating cylinders do, of course, also act on these bearings, although this only constitutes an additional side effect.

In addition to the three pressure-generating cylinders shown in FIG. 2, several pressure-generating cylinders can, if required, be positioned at appropriate locations. And, it is possible to minimize costs by providing only one pressure-generating cylinder and to replace, for example, cylinder 14 by at least one mechanical tension jack 19, and to replace cylinder 15 by at least one mechanically adjustable stop 22. Jack 19 and stop 22, shown in FIG. 4, are known devices and need not therefore be described in detail. Tension jack 19 is connected to casings 11 and 12 in any normal manner via joints 20 and 21. With such arrangement, however, at least one pressure-generating cylinder 13 for each pair of journals of the engaged cylinders remains in place for the arrangement shown in FIG. 4, so that it is possible to exert, as desired, different or alternating or varying forces during machine operation.

Figure 5:
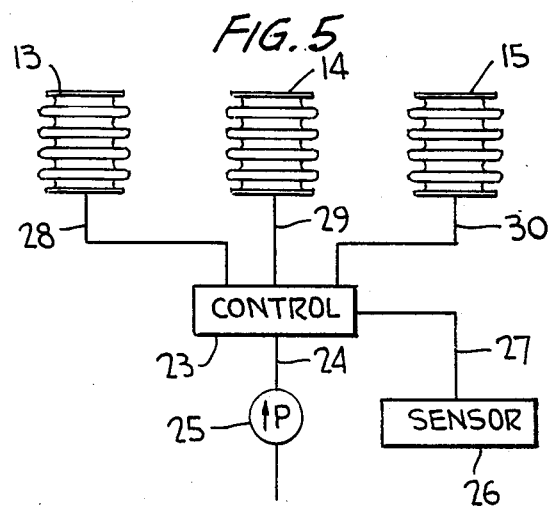
FIGS. 5, 6 and 7 are views showing optional pressure control arrangements for the pressure-generating cylinders.
Figure 6:
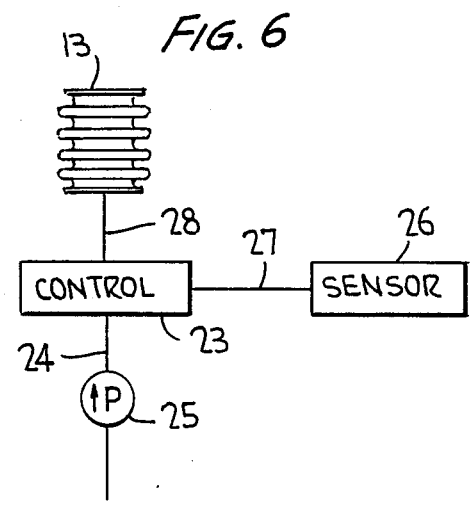
Figure 7:
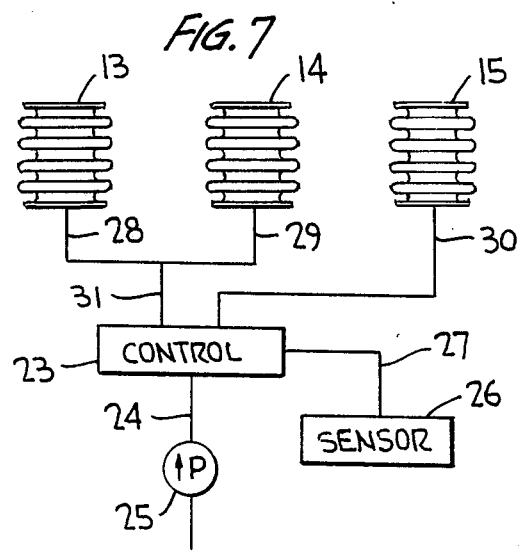

A control or regulating device 23 is provided for setting, controlling or regulating the hydraulic fluid supplied via a hydraulic line 24 and a pump 25. For automatic control, a sensor 26 is connected to a control device through a hydraulic line 27. The sensor may, for example, signal the flexure of cylinder 2 and/or cylinder 3 and cause the control device to supply corresponding pressures to pressure producing cylinders 13, 14 and 15 via hydraulic lines 28, 29, 30 and 31, as shown for the options in FIGS. 5, 6 and 7.

Obviously, many other modifications and variations of the invention are made possible in the light of the above teachings. It is therefore to be understood that within the scope of the appended claims the invention may be practiced otherwise than as specifically described.

What is claimed is:

1. In a machine having a pair of cylinders for processing a continuous web or sheets passing between the nip thereof, the cylinders having shafts journalled at opposite ends in a frame of the machine, first bearings mounted in said frame on opposite ends of said shafts, the size of the nip between the cylinders being adjustable, auxiliary casings supporting second bearings on the opposite ends of said shafts and positioned adjacent said first bearings, pairs of said casings having a gap therebetween being mounted on said frame for adjustment relative to said frame and to one another in a direction perpendicular to said shafts, and at least one pressure medium cylinder means acting between said frame and at least one of said casings in said direction for adjusting the size of the gap between said casings and for thus adjusting the size of the nip between the cylinders.

2. The machine according to claim 1, wherein said first bearings are located outwardly of said second bearings.

3. The machine according to claim 1, wherein pressure medium cylinder means act between said frame and each of said casings in said direction.

4. The machine according to claim 1, wherein another pressure medium cylinder means acts between said casings in said direction.

5. The machine according to claim 1, wherein an adjustable tension jack acts between said casings in said direction.

6. The machine according to claim 1, wherein an adjustable stop device acts between said frame and the other of said casings in said direction.

7. The machine according to claim 1, wherein said pressure medium cylinder means comprises a metallic bellows cylinder capable of expansion and contraction in said direction.

8. The machine according to claim 3, wherein said pressure medium cylinder means each comprise a metallic bellows cylinder capable of expansion and contraction in said direction.

9. The machine according to claim 4, wherein said pressure medium cylinder means comprises a metallic bellows cylinder capable of expansion and contraction in said direction.

10. The machine according to claim 1, wherein a second pressure medium cylinder means acts between said frame and the other of said casings in said direction, and another pressure medium cylinder means acts between said casings, said one and said second pressure medium cylinder means being located on one side of a plane intersecting the central axes of said pair of cylinders, and said another pressure medium cylinder means being located on an opposite side of said plane.

11. The machine according to claim 1, wherein a second pressure medium cylinder means acts between said frame and the other of said casings in said direction, and another pressure medium cylinder means acts between said casings, and control means provided for selectively pressurizing said pressure medium cylinder means individuallyor together.

* * * * *